Feb. 25, 1936.                H. HUEBER ET AL                2,032,320
                                    PUMP
                             Filed Feb. 11, 1932
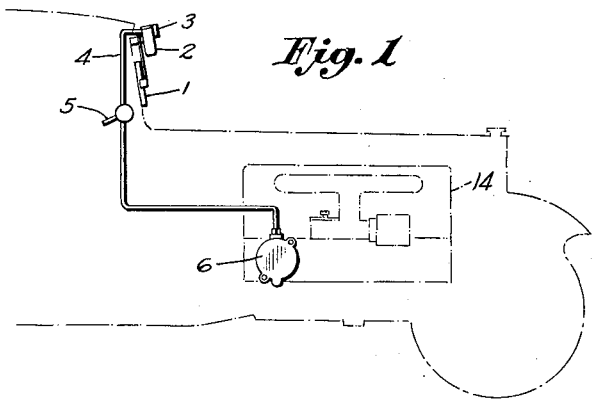
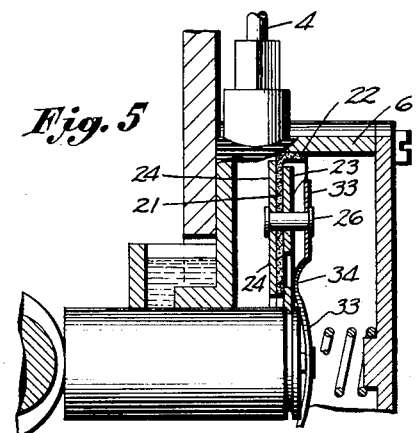
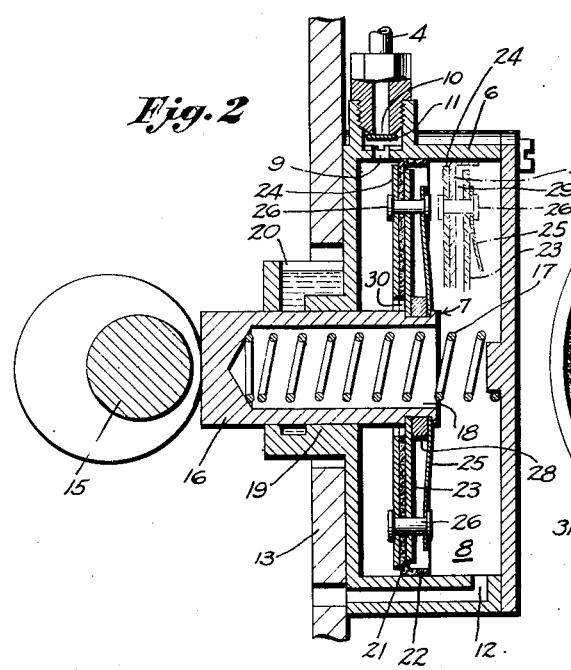
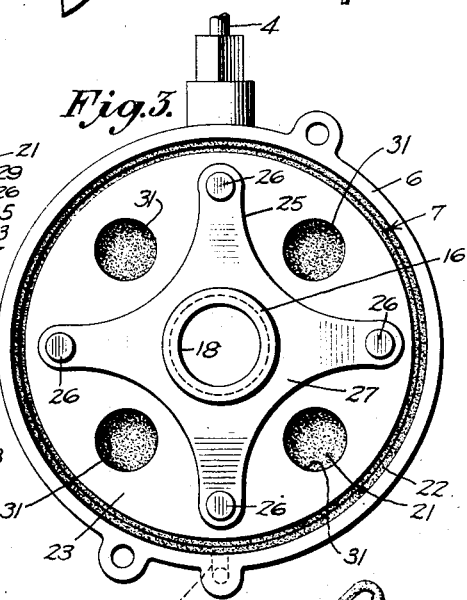
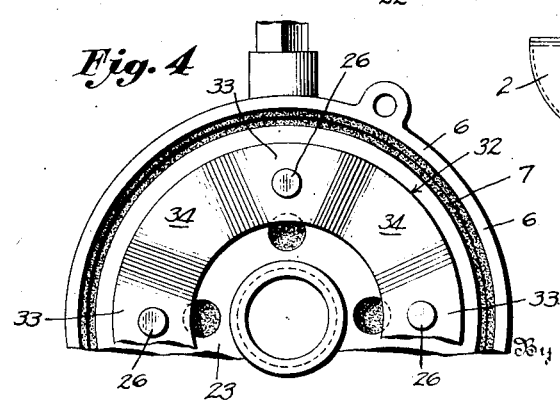
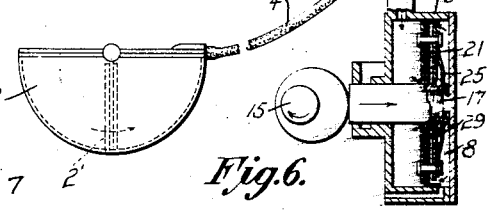
Inventors
Henry Hueber,
Erwin C. Horton.
By Bean & Brooks.
Attorneys Patented Feb. 25, 1936

2,032,320

UNITED STATES PATENT OFFICE 2,032,320

PUMP

Henry Hueber, Buffalo, and Erwin C. Horton, Hamburg, N. Y., assignors to Trico Products Corporation, Buffalo, N. Y.

Application February 11, 1932, Serial No. 592,420

5 Claims. (Cl. 230—190)

This invention relates to an accessory system for motor vehicles in which the accessory, such as a windshield cleaner, embodies a fluid pressure motor, and the required pressure differential for operating the motor is supplied by a fluid pump. It is proposed to operate the pump from the engine cam shaft and since this shaft rotates at a high R. P. M. the pump is likewise operated at a high rate of speed.

The object of the present invention is to provide an improved accessory system, and a pump therefor, which will operate efficiently at high speed, in intaking and exhausting fluid, in a manner which will insure greater efficiency and a longer period of usefulness, and will automatically avoid building up of an abnormal pressure in excess of a predetermined degree.

In the accompanying drawing,—

Fig. 1 is a diagrammatic view showing the present invention as applied to a motor vehicle.

Fig. 2 is an axial sectional view through a pump showing one embodiment of the invention.

Fig. 3 is an elevation of the pump with the cover plate removed.

Fig. 4 is a similar view showing a modified construction.

Fig. 5 is a fragmentary sectional view of the form of the invention disclosed in Fig. 4.

Fig. 6 is a diagrammatic view of the windshield cleaner system.

In proceeding in accordance with the present invention the numeral 1 designates a windshield wiper which is automatically reciprocated across the windshield glass by the piston 2' of a fluid pressure motor 2 of a well known construction having an automatic valve mechanism generally indicated at 3 which operatively applies the fluid pressure to the motor 2 as supplied by the conduit 4. This conduit is connected to a source of operating pressure and the communication therewith is controlled through a manual valve 5. Such a windshield cleaner and control is exemplified in the patent to John R. Oishei and Henry Hueber No. 1,738,311.

The mechanism of the windshield cleaner is obviously delicate and, therefore, in order to avoid injury and undue strain thereon we associate with the same a self governing means for producing a predetermined low pressure or suction in ample quantity, and without excess, for the efficient operation of the cleaner.

This source of operating pressure is in the form of a fluid pump, preferably of the suction or low pressure type, and embodies a casing or cylinder 6 and a piston 7. At one side of the piston the chamber 8 is provided with an inlet port 9 which is in communication with the conduit 4. The inlet port is provided with a valve seat 10 with which a valve 11 engages to direct the flow of fluid inwardly. Preferably this valve is in the form of a light disk so as to float or be readily responsive to the action of the air currents, and in order to render the valve more sensitive the seat 10 is disposed in proximity to the chamber 8. The inlet port 9 is the only means of communication with the chamber 8 at that side of the piston, there being an outlet port 12 at the opposite side of the piston which preferably leads back into the crank case 13 of the motor vehicle engine 14.

The engine cam shaft 15 acts on the piston rod 16 for reciprocating the piston against the action of the spring 17, the latter acting to return the piston and being disposed in the chamber 18 of the rod 16 as is clearly shown in Fig. 2. The casing is provided with a bearing 19 in which the rod 16 finds slidable support, and also a lubricant well 20 which is in communication with the bearing 19 and surrounds the rod. The well 20 is disposed to catch a portion of the lubricant as it is splashed about in the engine crank case so that the lubricant in the well is constantly replenished and amply serves to lubricate the rod during its fast reciprocatory action.

For transferring the intaken fluid from one side to the opposite side of the piston during the return stroke in the normal operation of the pump, the piston is provided with means for so by-passing the fluid. To this end the piston is provided with a cup packing member 21 the flange or lip 22 of which lies in contact with the inner wall of the chamber 8 but is flexible so as to yield and by-pass the fluid about the periphery of the piston. The flange or lip 22 is extended away from the inlet port 9 so that as the piston moves inwardly the intaken fluid will be trapped by the seating of the valve 11 and will find escape about the periphery of the piston by the inward yielding of the lip or flange 22 so that on the outward stroke of the piston the by-passed fluid will be expelled through the port 12.

As a safety means for governing the pressure built up by the pump, the piston is provided with valving means which by-passes fluid on the power or pump stroke. In accordance with the present disclosure, the piston comprises a fixed plate or seat 23, fixedly secured to the piston rod 16 and against the inner side of which seats the body of the cup packing 21. Backing the body portion of the cup packing is an annular plate 24 which together with the cup packing is normally held against the seat or plate 23 by resilient means, such as the spring fingers 25 and suspending members or bolts 26, the latter having sliding support in the plate 23. The spring fingers 25 may be of any desired number and extend radially from a central hub 27 which is anchored to the piston rod 16 but preferably spaced from the plate 23 by a spacing washer 28 whereby the fingers properly overhang the plate in spaced relation. These fingers are under such tension as to normally hold the cup packing and backing ring 24 in compact relationship with the plate 23, the tension being of a predetermined degree so that the entire assembly will move as a unit until resisted or counteracted by abnormal pressure conditions.

For instance, if the valve 5 is closed, or the pump is supplying suction faster than the accessory 2 can accommodate or use it, then the low pressure which will occur in the chamber 8 at the inlet side of the piston will act on the cup packing, during the power or pumping stroke, to pull the packing and its backing plate rearwardly from the plate 23 and thereby provide a by-passing channel between the plate 23 and the cup packing, an indicated at 29 in the dotted showing of Fig. 2. Thereupon the fluid under greater pressure at the outer side of the piston will flow through the channel 29 and the central openings 30 of the cup packing and backing plate to thereby lower the pressure differential, following which the spring arms 25 will retract the cup packing into normal, sealing relation.

Thus, the piston may continue to operate without subjecting the suction line 4 to excessive pressure and without injury to the piston or pump construction.

Any lubricant which may enter the chamber 8 from the well 20 along the rod bearing 19 will pass about the piston to the front side thereof and be discharged through the port 12 back into the crank case. The plate 23 may be provided with a plurality of openings 31 to increase the by-passage of air from one side to the opposite side of the piston, such openings 31 being normally closed by the seating of the body portion of the cupped packing 21 thereover.

In Figs. 4 and 5, a modified construction is provided in which the corrugated resilient ring 32 is substituted for the resilient means 25, 27, the ring having the suspending members or bolts 26 suspended from the raised or hill portions 33, while the depressed or valley portions 34 of the corrugations seat on the plate 23. Thus each pair of valleys 34 support an intermediate hill portion 33 to provide a resilient support from which one of the members 26 is suspended. Therefore, the backing plate 24 and its cup packing are supported for movement away from the seat plate 23 to provide the by-passage 29.

In operation, the operating cam shaft will move the piston outwardly against the tension of the spring 17 and the latter will return the piston, and since the cam shaft operates at a very high speed of rotation it is obvious that the piston will also be reciprocated very rapidly. On its outward stroke the piston will draw in air past the valve 11 and on its inward stroke will by-pass such air, by the inward yielding of the lip or flange 22, to the forward side of the piston for discharge on the next outward stroke through the outlet port 12. Should the piston displace air faster than the accessory 2 requires, so that a greater differential is built up in the pressures at the opposite sides of the piston, such increased differential will approach its critical point as determined by the resiliency in the spring suspension for the cup packing and its backing plate. As soon as the pressure at the inlet side of the pump is so low as to overcome the spring suspension the packing will move away from the seat plate 23 and permit the by-passing of fluid under higher pressure from the outer side of the piston through the channel 29 and the openings 31, through the central passages 30 and tend to dissipate the vacuous condition at the inner side of the piston or at least restore the pressure differential to a normal. If the suction line 4 is closed by the valve 5 the piston will idle back and forth by reason of the opening up of the piston passage 29 on the power stroke and the yielding of the lip 22 on the return stroke.

The plate 23, together with the cup packing 21 and the backing plate 24, constitute the component parts of the piston which are held in their normal operative pumping relation by the resilient means 25, (32) which resilient means is responsive to pressure of a predetermined degree, or to an abnormal pressure differential for permitting the separation of such component parts to thereby provide a by-pass through the piston from one side to the other side thereof. The type of piston herein shown is preferred over the diaphragm type although in the appended claims the term piston is used in its inclusive sense when referring to the by-passing action of the component parts.

Referring to Fig. 6, and to the dotted showing in Fig. 2, it will be more clearly observed that the producer for the operating pressure, whether it be negative or positive, acts to relieve excessive pressure influences on the delicate cleaner mechanism to thereby avoid injury thereto. The piston rod is given a positive stroke by the cam shaft 15 on the suction producing stroke. Consequently the air column between the pump chamber 8 and the windshield cleaner is given a strong urge. If the wiper 1 should for any reason be resisted in its movement, such as by the packing of snow in advance thereof, any such sudden impulses given to the pump piston and transmitted through the air column to the cleaner piston would subject the latter to undue strains were it not for the fact that the pump piston is self-governing as to the degree of suction which it produces. This is provided for by the by-passing construction of the pump piston, such by-passing being accomplished in the presence of a predetermined low pressure or suction. Therefore, while the suction stroke of the pump is normally a positive one and its return stroke a yieldable one, any force tending to unnecessarily strain the windshield cleaner mechanism is dampened or cushioned by reason of the by-passing action of the piston at a predetermined negative pressure.

What is claimed is:

1. A high speed pump for fluid operated automotive accessories, comprising a piston, a cylinder casing therefor having an inlet port at one side of the piston and an outlet port at the opposite side thereof, said piston comprising a fixed plate, a relatively movable cup packing in which the plate is normally nested for pumping, said packing having its flange in packing engagement with the inner wall of the casing and yieldable therefrom to by-pass fluid from the inlet side to the outlet side of the piston on one stroke of the latter, and resilient means holding the plate and cup packing in nested relation but permitting movement of the packing from the plate to form a passage through the piston to avoid an abnormal pressure differential on the piston, said cup packing having an opening normally closed by seating on the fixed plate of the piston.

2. A piston for a pump chamber comprising a cup packing having an aperture and having the peripheral flange thereof for engagement with the chamber wall and movable inwardly therefrom to by-pass fluid in one direction, a member normally adjacent said cup for closing said aperture and separable from the cup to provide a by-pass for fluid in the opposite direction, and resilient means urging said cup and member into said normal relationship.

3. A piston assembly for a pump chamber comprising a piston rod, a cup packing member having an aperture and having the peripheral flange thereof for engagement with the chamber wall and movable inwardly from the chamber wall to by-pass fluid in one direction, a closure member normally adjacent said cup for closing said aperture and separable from the cup to provide a by-pass for fluid in the opposite direction, one of said members being affixed to the piston rod, and resilient means connecting the other of said members to the piston rod, whereby in the presence of a pressure differential on opposite sides of the piston sufficient to extend the resilient means, said members will separate to by-pass fluid.

4. In a piston assembly for by-passing fluid in the presence of a predetermined pressure differential on the faces of the piston during reciprocation of the piston in a cylinder, a piston rod, a member of lesser diameter than the cylinder and secured to the piston rod, a second member having peripheral portions for sliding engagement with the walls of the cylinder and having a portion inwardly of said peripheral portions provided with an aperture extending therethrough, the first and second mentioned members being normally juxtaposed whereby the first mentioned member normally closes the aperture in the second member, an element secured to the piston rod having radial resilient arms, and means connecting end portions of the arms to said second member for retaining the first and second members in juxtaposition, said second member being movable away from the first mentioned member upon flexure of said resilient arms.

5. In a pump piston, a cup packing having the peripheral flange thereof engageable with a cylinder wall and flexible inwardly therefrom on one stroke of the piston to allow fluid to pass thereby when the pressure on the inlet side of the piston exceeds the pressure on the outlet side thereof, said piston having a passage therethrough for passing fluid from the outlet side thereof to the inlet side thereof, valve means for said passage carried by the piston, and means carried by the piston for holding said valve closed when the pressure on the outlet side exceeds the pressure on the inlet side by less than a predetermined degree.

HENRY HUEBER.
ERWIN C. HORTON.